US012601418B2

(12) United States Patent
Orr

(10) Patent No.: US 12,601,418 B2
(45) Date of Patent: Apr. 14, 2026

(54) RELIEF VALVE ASSEMBLY

(71) Applicant: Zurn Water, LLC, Milwaukee, WI (US)

(72) Inventor: William M. Orr, Paso Robles, CA (US)

(73) Assignee: ZURN WATER, LLC, Milwaukee, WI (US)

( * ) Notice: Subject to any disclaimer, the term of this patent is extended or adjusted under 35 U.S.C. 154(b) by 173 days.

(21) Appl. No.: 18/345,894

(22) Filed: Jun. 30, 2023

(65) Prior Publication Data

US 2024/0003456 A1     Jan. 4, 2024

Related U.S. Application Data

(60) Provisional application No. 63/367,543, filed on Jul. 1, 2022.

(51) Int. Cl.
| | |
|---|---|
| *F16K 27/12* | (2006.01) |
| *E03B 7/07* | (2006.01) |
| *F16K 15/06* | (2006.01) |
| *F16K 17/04* | (2006.01) |
| *F16K 27/02* | (2006.01) |

(52) U.S. Cl.
CPC .............. *F16K 27/12* (2013.01); *E03B 7/077* (2013.01); *F16K 15/067* (2021.08); *F16K 17/04* (2013.01); *F16K 27/0209* (2013.01); *Y10T 137/7869* (2015.04); *Y10T 137/7876* (2015.04)

(58) Field of Classification Search
CPC . E03B 7/077; E03B 7/078; E03C 1/10; E03C 1/104; E03C 1/106; E03C 1/108; F16K 15/067; F16K 17/0413; F16K 17/0466; F16K 17/048; F16K 27/00; F16K 27/003; F16K 27/02; F16K 27/08; F16K 27/12; F16K 31/1262; F16K 31/1266; F16K 2200/502; F16K 17/04; F16K 27/0209; Y10T 137/7869; Y10T 137/7876
USPC .......... 137/505, 505.36, 540, 543, 517, 522, 137/528, 529, 859
See application file for complete search history.

(56) References Cited

U.S. PATENT DOCUMENTS

| | | | | |
|---|---|---|---|---|
| 442,284 | A * | 12/1890 | Craig ...................... | F16K 15/06 137/533.29 |
| 2,706,488 | A * | 4/1955 | Harrington ............. | E03C 1/106 137/215 |
| 4,506,694 | A * | 3/1985 | Daghe ..................... | E03C 1/108 137/107 |
| 4,553,563 | A * | 11/1985 | Daghe ..................... | E03C 1/108 137/107 |
| 4,633,897 | A * | 1/1987 | Effenberger ............ | F16K 27/00 251/291 |

(Continued)

*Primary Examiner* — Kenneth Rinehart
*Assistant Examiner* — Jonathan J Waddy
(74) *Attorney, Agent, or Firm* — Husch Blackwell LLP

(57) ABSTRACT

A relief valve for a backflow preventer includes a plunger, a lock nut, and a seal. The plunger has a female fastening section and a first seal engagement surface. The lock nut has a male fastening section and a second seal engagement surface. The male fastening section is received by the female fastening section to bring the first seal engagement surface toward the second seal engagement surface. The seal is positioned between the first seal engagement surface and the second seal engagement surface.

20 Claims, 19 Drawing Sheets

(56)                    References Cited

U.S. PATENT DOCUMENTS

| | | | | |
|---|---|---|---|---|
| 5,297,635 | A * | 3/1994 | McHugh | E03B 7/072 |
| | | | | 169/23 |
| 5,312,355 | A * | 5/1994 | Lee | A61M 25/0668 |
| | | | | 604/161 |
| 5,425,393 | A * | 6/1995 | Everett | E03C 1/106 |
| | | | | 137/107 |
| 10,127,790 | B2 * | 11/2018 | Doughty | E03B 7/078 |
| 2006/0145116 | A1 * | 7/2006 | Rickerd | A61M 39/0606 |
| | | | | 264/239 |
| 2013/0306167 | A1 * | 11/2013 | Sisk | F16K 27/0209 |
| | | | | 137/540.11 |
| 2024/0036226 | A1 * | 2/2024 | Castrigno | G01V 3/02 |

* cited by examiner

RELIEF VALVE ASSEMBLY

CROSS-REFERENCE TO RELATED APPLICATION

This application claims the benefit of prior-filed U.S. Provisional Patent Application No. 63/367,543, filed Jul. 1, 2022, the entire contents of which are incorporated by reference.

TECHNICAL FIELD

The present disclosure relates to relief valve assemblies, and more specifically, to relief valve assemblies for backflow preventers.

SUMMARY

In one independent aspect, a shroud for a relief valve includes a first portion having a first tongue and a first groove, the first groove positioned on an opposite side of first portion from the first tongue; and a second portion having a second tongue and a second groove, the second groove positioned on an opposite side of first portion from the second tongue, the first groove receiving the second tongue and the second groove receiving the first tongue to enclose at least a portion of the relief valve.

In another independent aspect, a relief valve cover is provided for coupling a drain funnel to a relief valve. The relief valve cover includes a cover body including an attachment surface, the cover body configured to be coupled to the relief valve; a water supply passage positioned in the cover body; a recess positioned on the cover body adjacent the attachment surface, the recess in fluid communication with the water supply passage and receiving water at a supply water pressure; and at least one opening receiving a fastener to engage the drain funnel.

In another independent aspect, a relief valve for a backflow preventer includes a plunger having a female fastening section and a first seal engagement surface; a lock nut having a male fastening section and a second seal engagement surface, the male fastening section received by the female fastening section to bring the first seal engagement surface toward the second seal engagement surface; and a seal positioned between the first seal engagement surface and the second seal engagement surface.

In another independent aspect, a shroud for a relief valve includes an opening; an outlet an outlet positioned opposite the opening; and a peripheral wall extending between the opening and the outlet; wherein a portion of the peripheral wall defines a maximum diameter of the shroud, and the outlet has a diameter than is less than the maximum diameter.

In another independent aspect, a shroud for a relief valve includes a first portion; a second portion coupled to the first portion to enclose at least a portion of the relief valve; an opening; an outlet positioned opposite the opening; and a peripheral wall extending between the opening and the outlet; wherein at least one of the first portion and the second portion includes a removable tab, removal of the removable tab forming a window in the one of the first portion and the second portion.

In yet another independent aspect, a shroud for a relief valve includes a first portion; a second portion coupled to the first portion to enclose at least a portion of the relief valve; an opening; an outlet positioned opposite the opening; and a peripheral wall extending between the opening and the outlet; wherein at least one of the first portion and the second portion includes a window.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
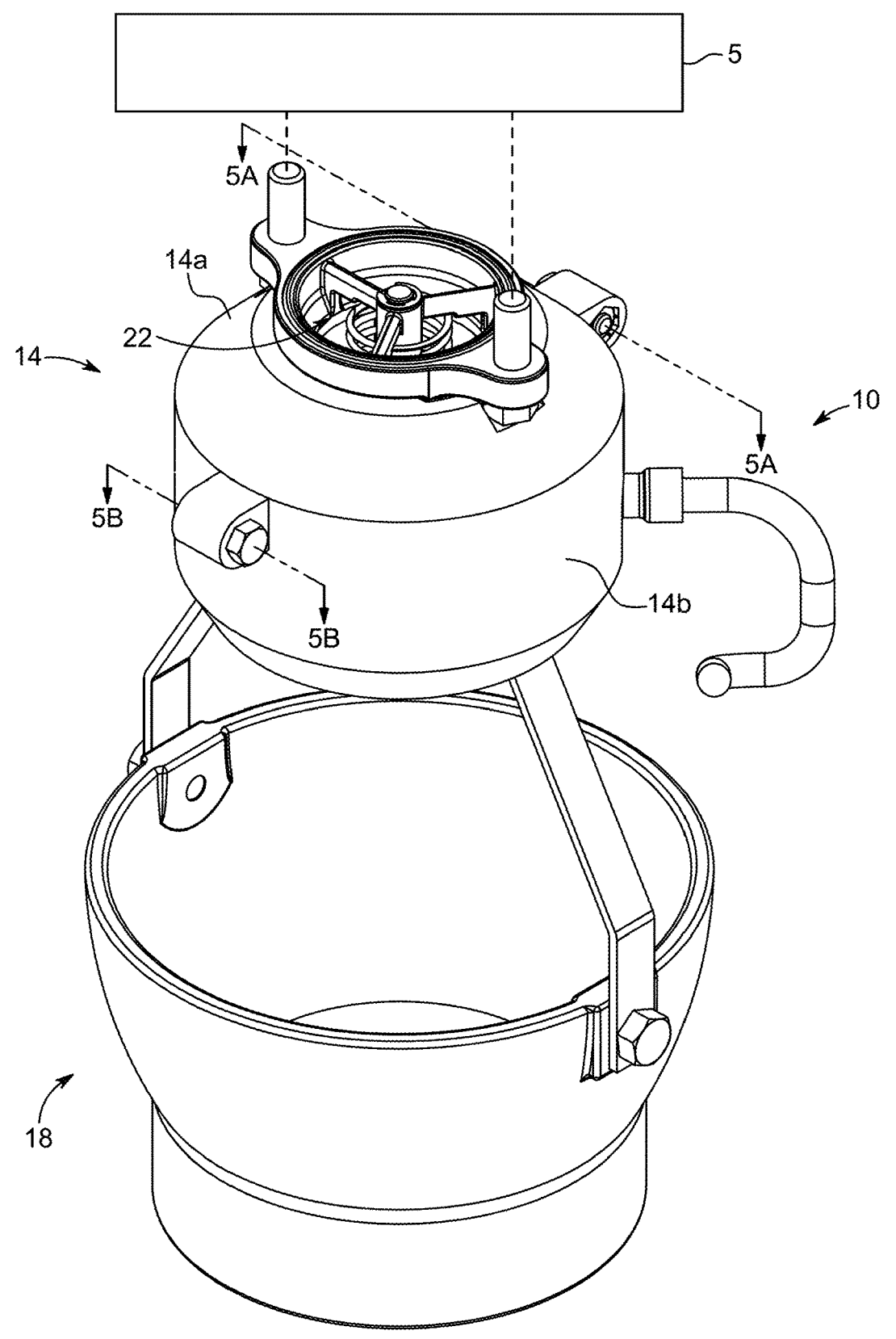
FIG. 1 is a perspective view of a relief valve assembly including a shroud, a drain funnel, and a relief valve.

FIG. 1 illustrates a relief valve assembly 10 (for example, a compact relief valve assembly 10). The relief valve assembly 10 may be used to relieve discharge water to inhibit reverse flow in backflow preventers 5.

Figure 2:
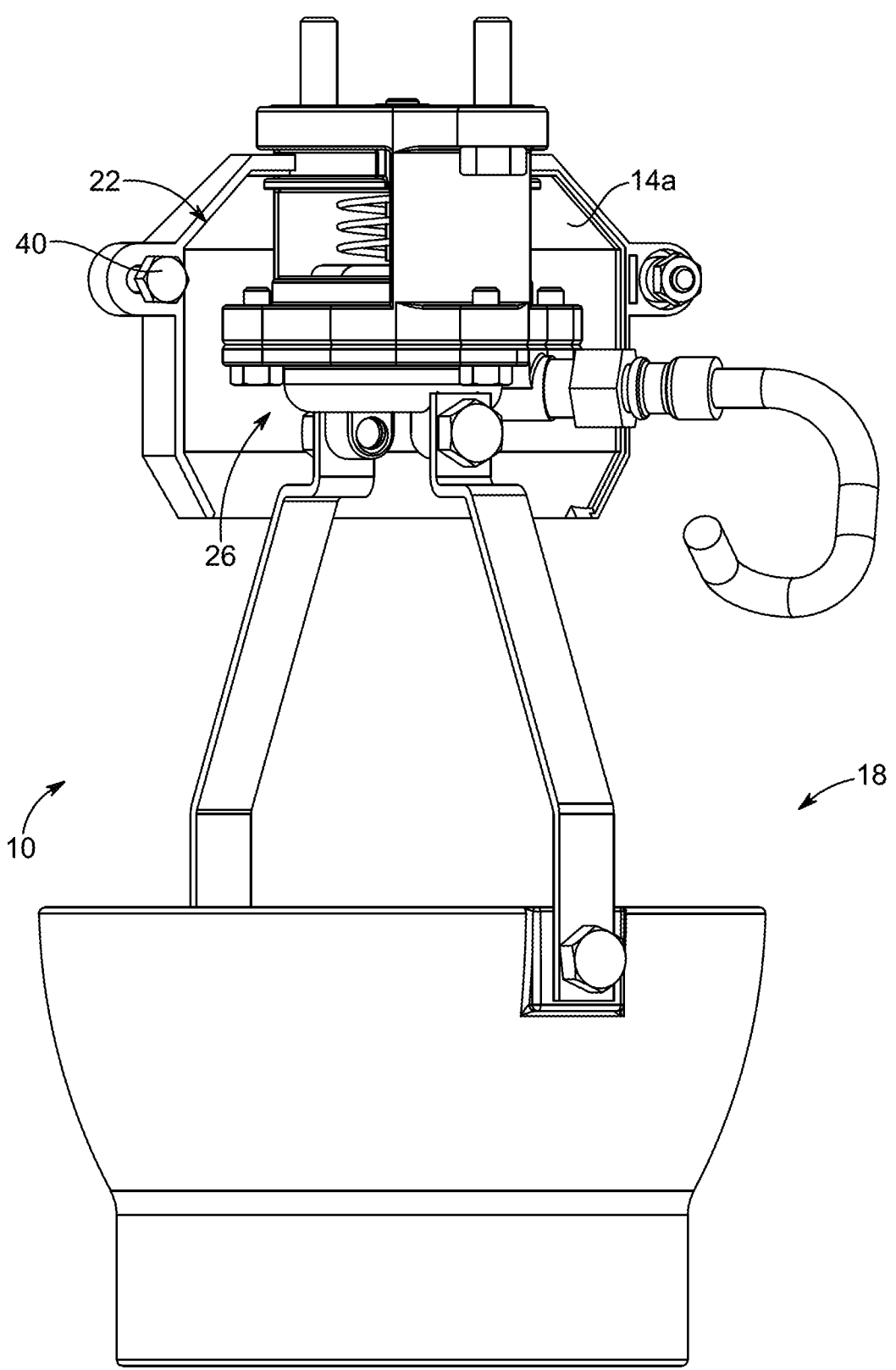
FIG. 2 is a front view of the relief valve assembly of FIG. 1 missing a shroud portion of the shroud.

As illustrated in FIG. 1, the relief valve assembly 10 includes a shroud 14 and a drain funnel 18. With reference to FIG. 2, the relief valve assembly 10 further includes a relief valve 22 and a relief valve cover 26 positioned at an end of the relief valve 22. The shroud 14 of FIG. 1 at least partially encloses the relief valve 22. The drain funnel 18 is coupled to and extends away from the relief valve cover 26. The relief valve 22 is configured to receive fluid from a backflow preventer 5 opposite the relief valve cover 26.

Figure 3A:
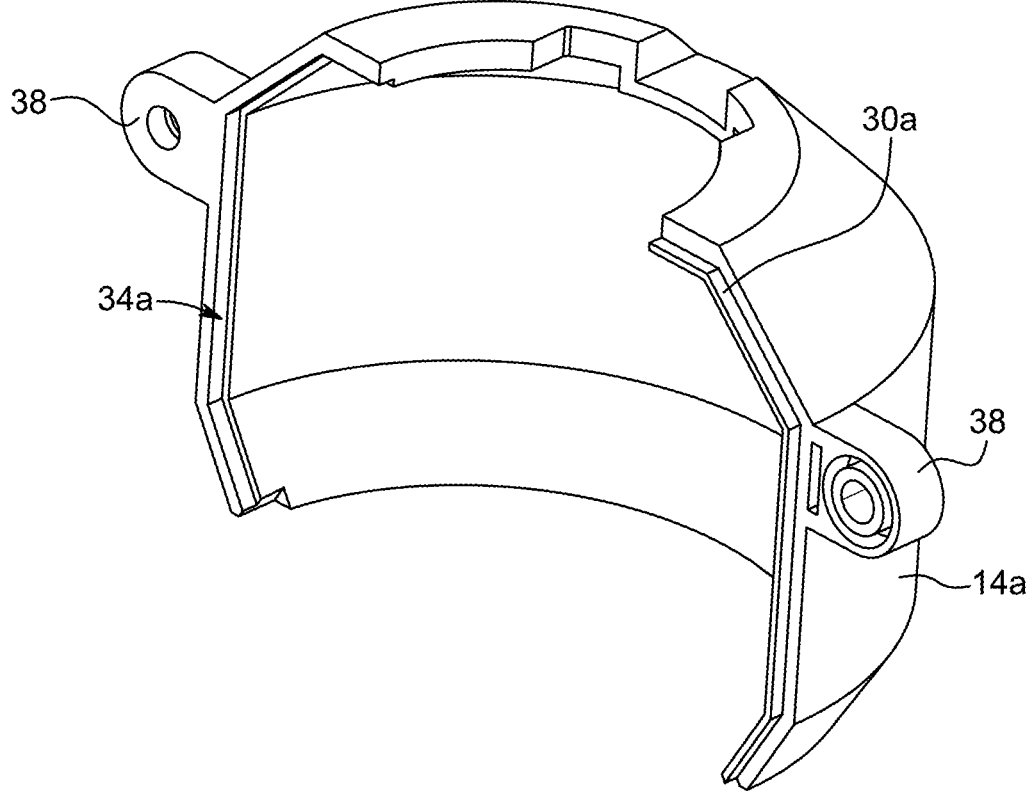
FIG. 3A is a perspective view of a first shroud portion of the shroud of FIG. 1.
Figure 3B:
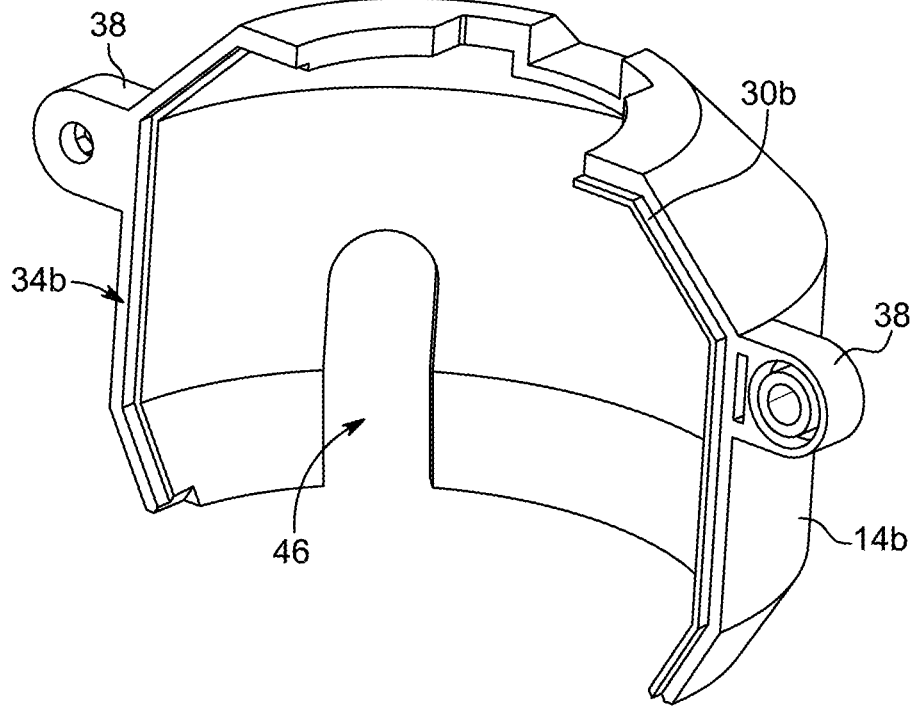
FIG. 3B is a perspective view of a second shroud portion of the shroud of FIG. 1.
Figure 4A:
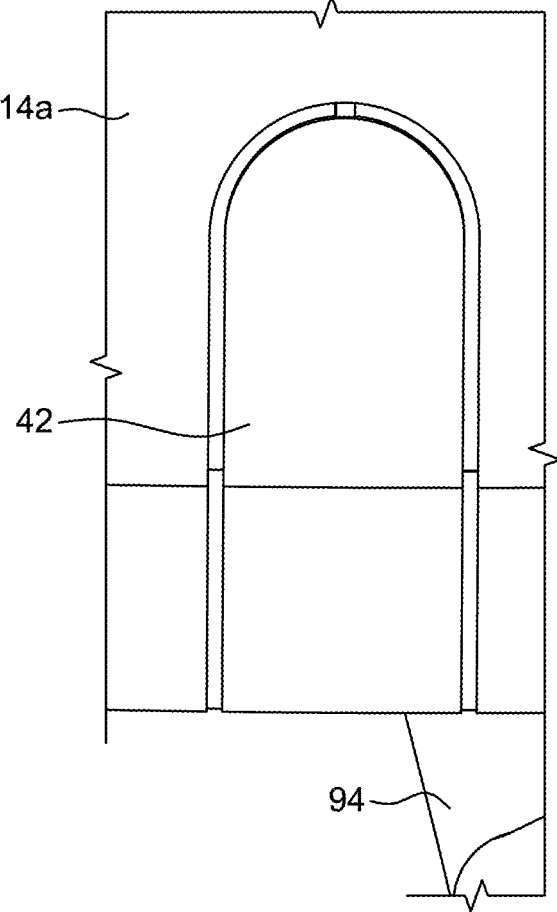
FIG. 4A is a front view of a removable tab in the first shroud portion of FIG. 3A.
Figure 4B:
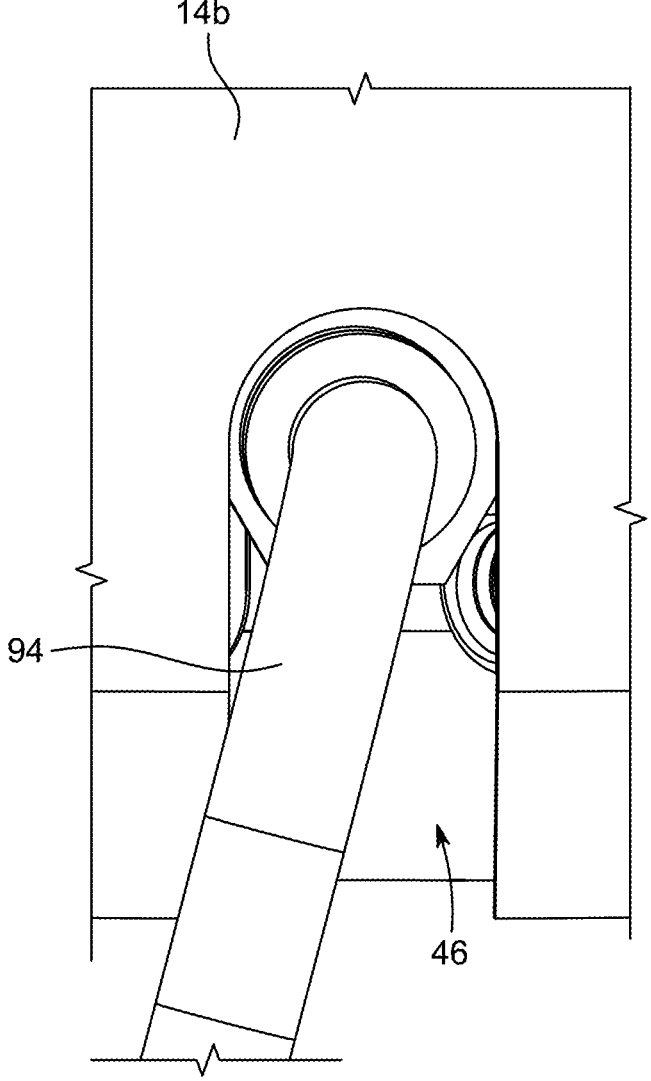
FIG. 4B is a front view of a window in the second shroud portion of FIG. 3B.

With reference to FIGS. 3A and 3B, the shroud 14 of FIG. 1 is made up of a first shroud portion 14*a* and a second shroud portion 14*b*. In some embodiments, the first shroud portion 14*a* and the second shroud portion 14*b* may be substantially identical. In other embodiments, the first shroud portion 14*a* and the second shroud portion 14*b* may be different. In the illustrated embodiment, the first shroud portion 14*a* includes a first tongue 30*a* and a first groove 34*a*. The second shroud portion 14*b* includes a second tongue 30*b* and a second groove 34*b*. The first groove 34*a* is positioned on the first shroud portion 14*a* diametrically opposite the first tongue 30*a*. The second groove 34*b* is positioned on the second shroud portion 14*b* diametrically opposite the second tongue 30*b*. Each shroud portion 14*a*, 14*b* further includes fastener receiving tabs 38 and a removable tab 42 (best illustrated in FIG. 4A). Each fastener receiving tab 38 is positioned adjacent a corresponding one of the tongues 30*a*, 30*b* and the grooves 34*a*, 34*b* on a corresponding shroud portion 14*a*, 14*b*. As illustrated in FIGS. 4A and 4B, each shroud portion 14*a*, 14*b* may include one removable tab 42. The removable tab 42, as illustrated in FIG. 4A, may be broken off from the shroud portion 14*a*, 14*b*, thereby creating a slot or window 46, as illustrated in FIG. 4B, in the shroud portion 14*a*, 14*b*. The removable tab 42 of FIG. 4A may be broken off (for example, by hand or with a tool such as pliers). In some embodiments, the removable tab 42 may be considered a breakaway tab. Using a removable tab 42 allows the shroud portions 14*a*, 14*b* to be manufactured using identical molds. The window 46 can then be selectively introduced to just one of the shroud portions 14*a*, 14*b* after molding by breaking off the removable tab 42. In other embodiments, the slot or window 46 may be integrally formed in one of the shroud portions 14*a*, 14*b*.

Figure 5A:
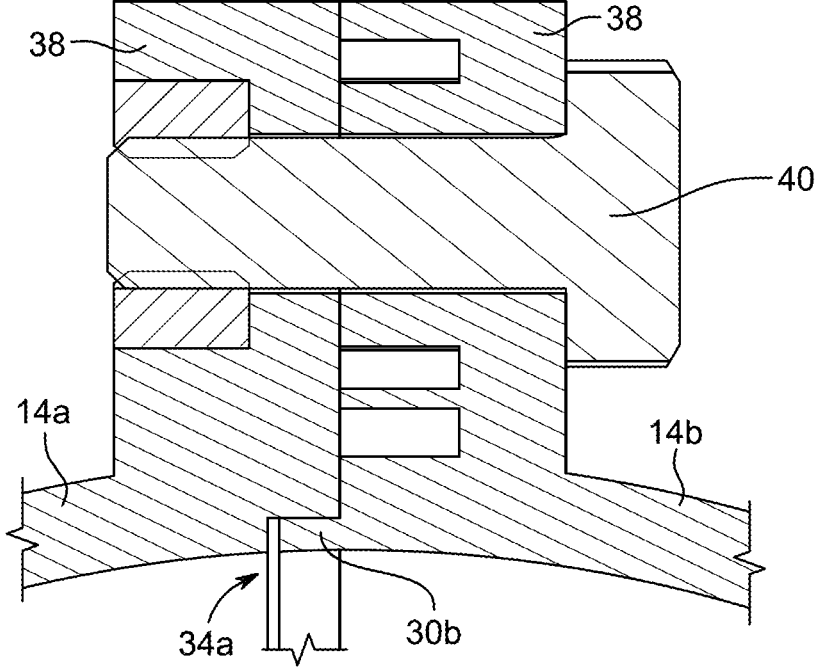
FIG. 5A is a cross-sectional view of the first and second shroud portions fastened together to form the shroud of FIG. 1 viewed along section 5A-5A.
Figure 5B:
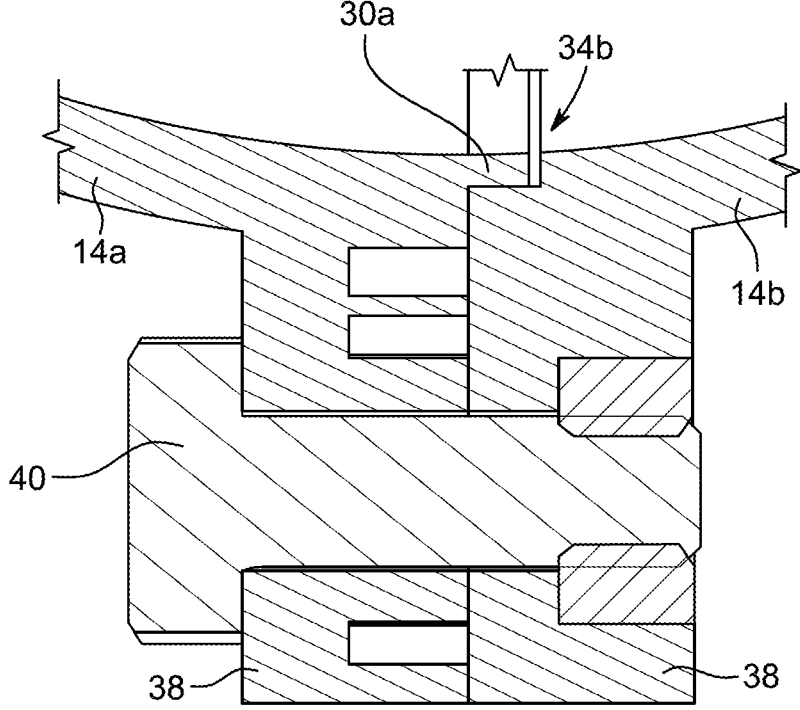
FIG. 5B is a cross-sectional view of the first and second shroud portions fastened together to form the shroud of FIG. 1 viewed along section 5B-5B.
Figure 6:
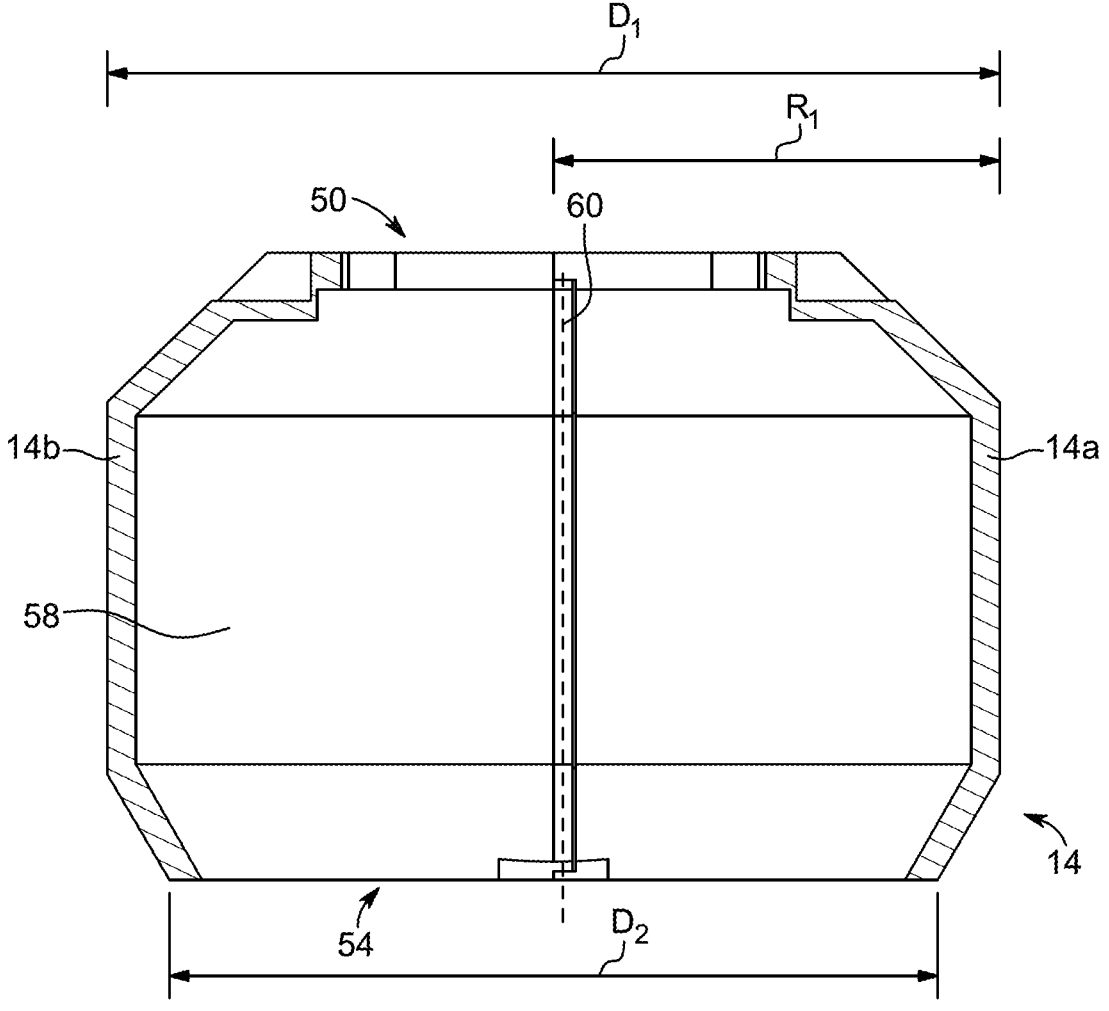
FIG. 6 is a cross-sectional view of the shroud of FIG. 1 viewed along a center of the shroud.

With reference to FIGS. 5A and 5B, when assembled (or in an assembled state), the first groove 34*a* receives the second tongue 30*b* and the second groove 34*b* receives the first tongue 30*a* to enclose at least a portion of the relief valve 22 of FIG. 2. The first groove 34*a* receives the second tongue 30*b*, and the second groove 34*b* receives the first tongue 30*a* to advantageously provide a tolerance for the assembled shroud 14. Specifically, the shroud 14 may be subjected to high fluid (i.e., water) pressure that causes the shroud portions 14*a*, 14*b* to move, or flex. The tolerance provided by the connection between the first tongue 30*a* and the second groove 34*b* and the second tongue 30*b* and the first groove 34*a* enables the shroud portions 14*a*, 14*b* to move, or flex, by the length of the tongues 30*a*, 30*b* before fluid begins to leak out of the shroud 14 undesirably. Stated another way, a radius $R_1$, as illustrated in FIG. 6, of the shroud 14 is extendable by a length of the tongues 30*a*, 30*b*. The provided tolerance improves the ability of the shroud 14 to control fluid spray, or scatter, of the relief valve assembly 10 of FIG. 1. Each of the fastener receiving tabs 38 on one of the shroud portions 14*a*, 14*b* mates with a corresponding fastener receiving tab 38 on the other of the shroud portions 14*a*, 14*b* and may be coupled to one another (e.g., by fasteners 40—FIGS. 5A and 5B).

As illustrated in FIG. 6, in the assembled state, the shroud 14 includes a relief valve receiving opening 50, an outlet opening 54 opposite the relief valve receiving opening 50, and a peripheral wall 58 extending between the relief valve receiving opening 50 and the outlet opening 54. The peripheral wall 58 defines a maximum diameter $D_1$ of the shroud 14. In the illustrated embodiment, the peripheral wall 58 includes an intermediate portion defining the maximum diameter $D_1$, and the peripheral wall 58 tapers inwardly from the intermediate portion toward the outlet opening 54. The outlet opening 54 may have a smaller diameter (or a reduced diameter) $D_2$ compared to the maximum diameter $D_1$. The peripheral wall 58 may curve arcuately inward proximate the outlet opening 54. Additionally, or alternatively, the peripheral wall 58 may extend linearly inward proximate the outlet opening 54. The reduced diameter $D_2$ of the shroud 14 at the outlet opening 54 advantageously improves the ability of the relief valve assembly 10 of FIG. 1 to direct fluid out of the outlet opening 54 substantially parallel to a centerline 60 of the outlet opening 54. For example, in absence of the reduced diameter $D_2$ of the outlet opening 54, fluid may spray outwards from the outlet opening 54 in a direction substantially transverse to the centerline 60 of the outlet opening 54.

Figure 7:
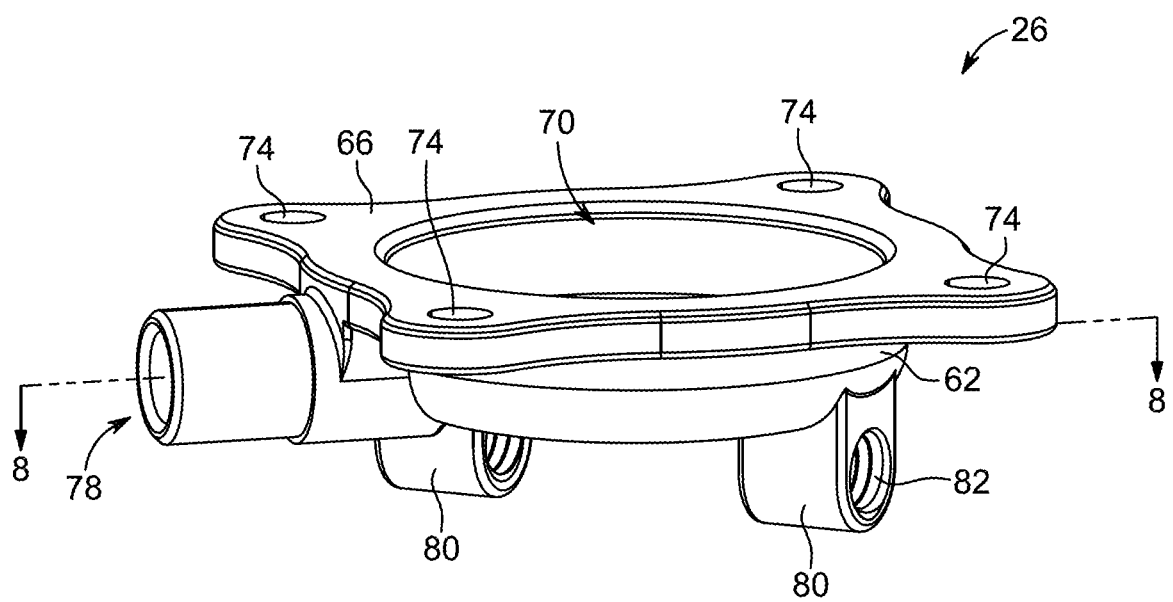
FIG. 7 is a perspective view of a relief valve cover for the relief valve assembly of FIG. 1.
Figure 8:
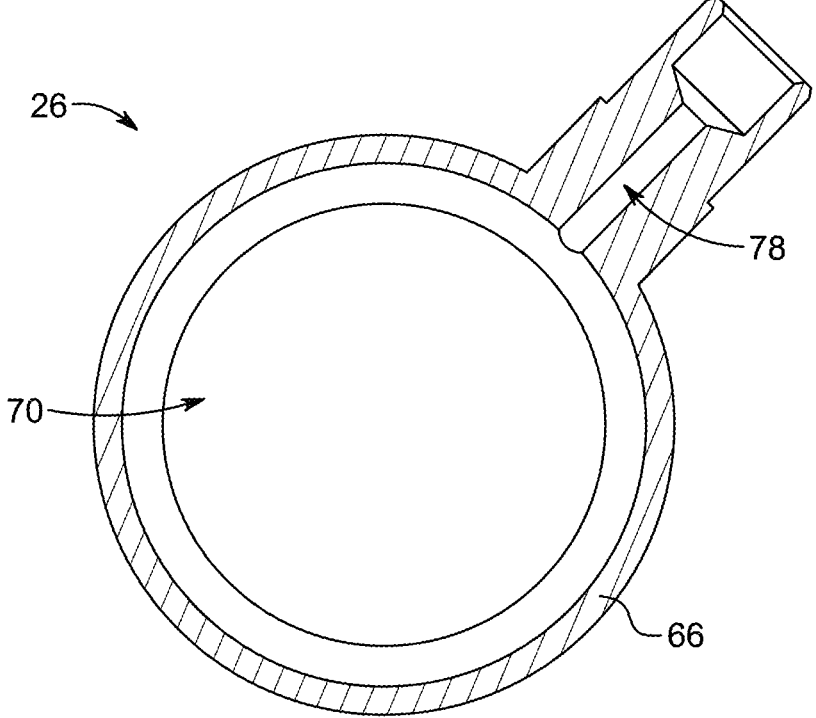
FIG. 8 is a section view of the relief valve cover of FIG. 7 viewed along section 8-8.
Figure 9:
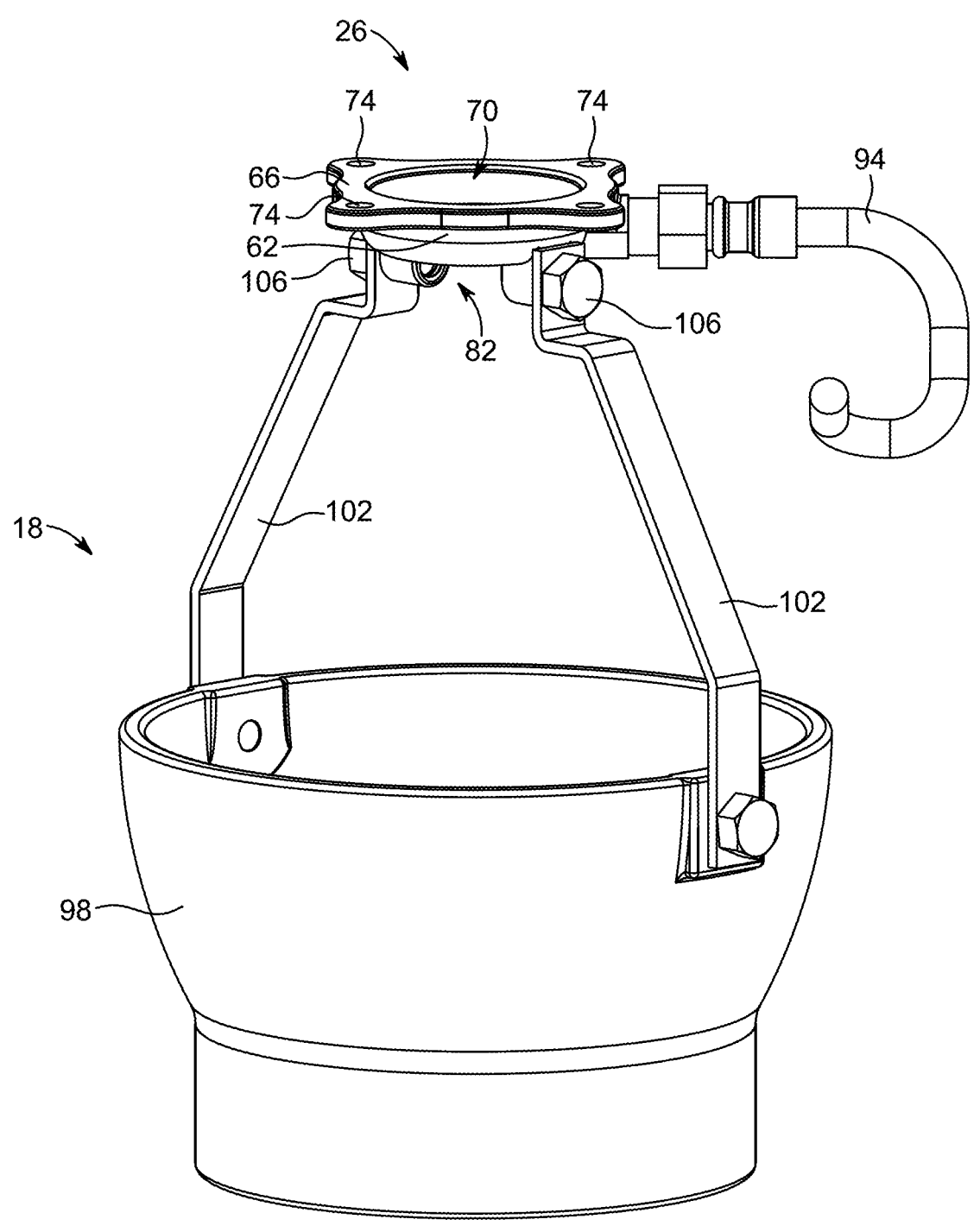
FIG. 9 is a perspective view of the drain funnel of FIG. 1 and the relief valve cover of FIG. 7.
Figure 10:
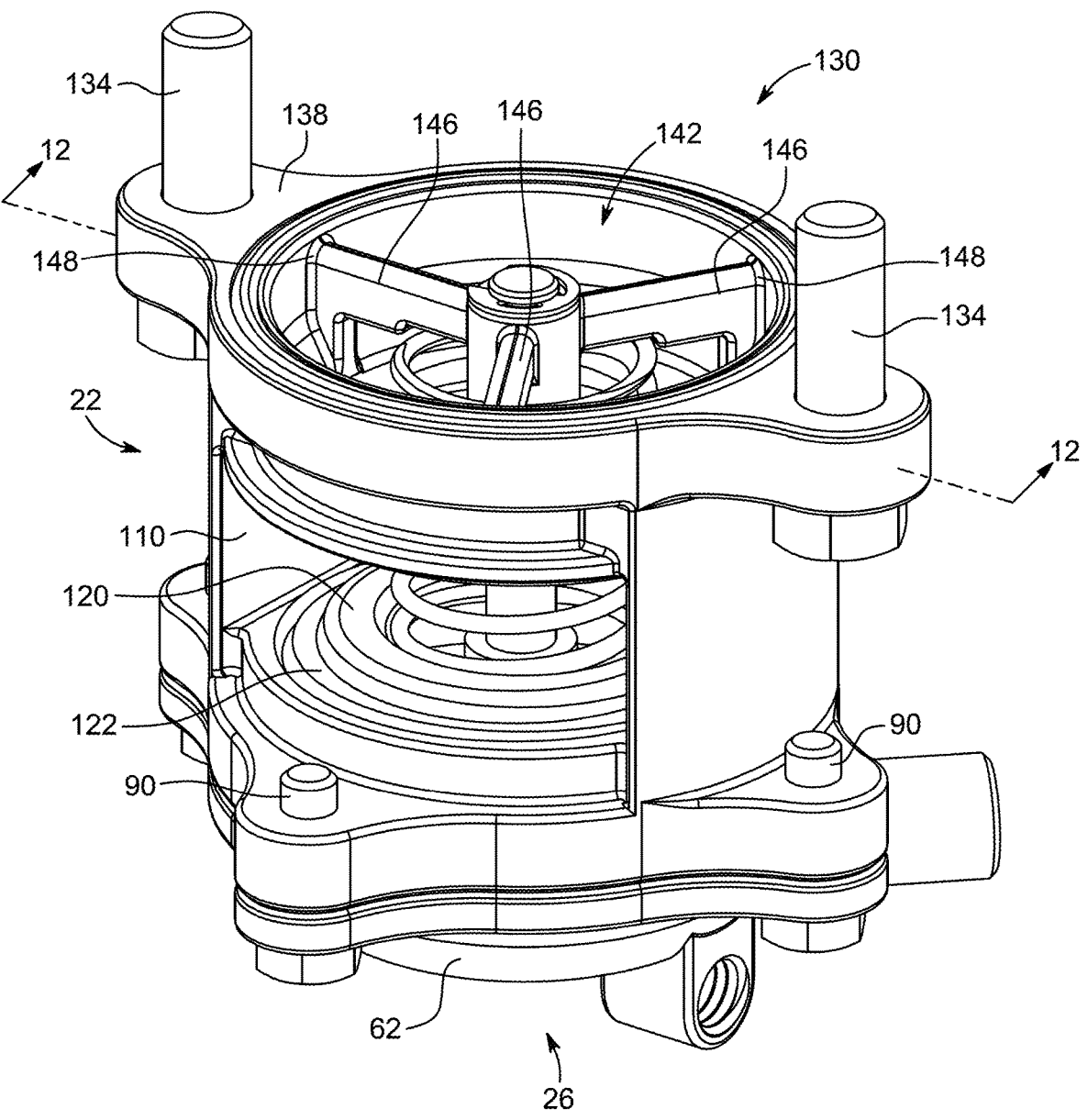
FIG. 10 is a perspective view of the relief valve of FIG. 1 and the relief valve cover of FIG. 7.

As illustrated in FIGS. 7 and 8, the relief valve cover 26 includes a cover body 62 having an attachment surface 66, a recess 70 positioned in the cover body 62, a plurality of through holes 74, a water supply passage 78, and at least one projection 80 (FIG. 7) having an opening 82 extending therethrough for coupling with the drain funnel 18. The cover body 62 is configured to be coupled to a frame 110 of the relief valve 22, as illustrated in FIG. 10 and described in more detail below. In some embodiments, the attachment surface 66 is configured to face the frame 110 (FIG. 10) of the relief valve 22. The attachment surface 66 surrounds the recess 70. The plurality of through holes 74 pass through the attachment surface 66. With reference to FIG. 10, the through holes 74 of FIG. 7 receive respective fasteners 90 to couple the relief valve cover 26 to the frame 110 of the relief valve 22. Stated another way, the fasteners 90 extend through the cover body 62 and the attachment surface 66 of FIG. 7 and into the relief valve 22 to couple the relief valve cover 26 to the frame 110 of the relief valve 22. Referring again to FIG. 8, the water supply passage 78 extends from the recess 70 outwardly from relief valve cover 26. The water supply passage 78 may be connected to a conduit (i.e., a hose) 94, as illustrated in FIG. 9, to supply outside fluid into the recess 70. The water supply passage 78 may have a threaded portion for coupling to the conduit 94. Referring again to FIGS. 4A and 4B, the conduit 94 extends out from the relief valve cover 26 of FIG. 7 through the window 46 created by the removed tab 42 in the shroud 14. By extending the conduit 94 out through the window 46, any discharged fluid that hits the conduit 94 and is deflected will still be within the shroud and can still be directed out of the outlet opening 54 substantially parallel to a centerline 60 of the outlet opening 54.

FIG. 9 illustrates the drain funnel 18 coupled to the relief valve cover 26. The drain funnel 18 includes a funnel body 98 and at least one bracket arm 102. In the illustrated embodiment, the drain funnel 18 includes two bracket arms 102. Each of the bracket arms 102 is coupled to the funnel body 98 at an end of the bracket arm 102. Each of the bracket arms 102 is further coupled to the relief valve cover 26 at another end of the bracket arm 102 opposite the funnel body 98. Specifically, the bracket arms 102 are coupled to the relief valve cover 26 at the at least one opening 82 in the projection 80. The projection 80 extends away from the recess 70 in a direction away from the attachment surface 66. Further, the relief valve cover 26 includes two projections 80 having a corresponding opening 82 (FIG. 7). Each opening 82 is coupled with a corresponding bracket arm 102. In the illustrated embodiment, the openings 82 are threaded. As shown in FIG. 9, a threaded fastener 106 may be placed through each of the bracket arms 102 and into a corresponding opening 82 to couple the bracket arms 102 to the relief valve cover 26. In the illustrated embodiment, the at least one opening 82, and thus each of the two openings 82, is opened in a direction perpendicular to the plurality of through holes 74. Further, the at least one opening 82, and thus each of the two openings 82, is located on a side of the recess 70 that is opposite the attachment surface 66. In other embodiments, the relief valve cover 26 may include just one opening 82 operable to couple with the bracket arms 102. In further embodiments, the opening 82 may be positioned elsewhere on the relief valve cover 26 and be opened in a different orientation.

Figure 11:
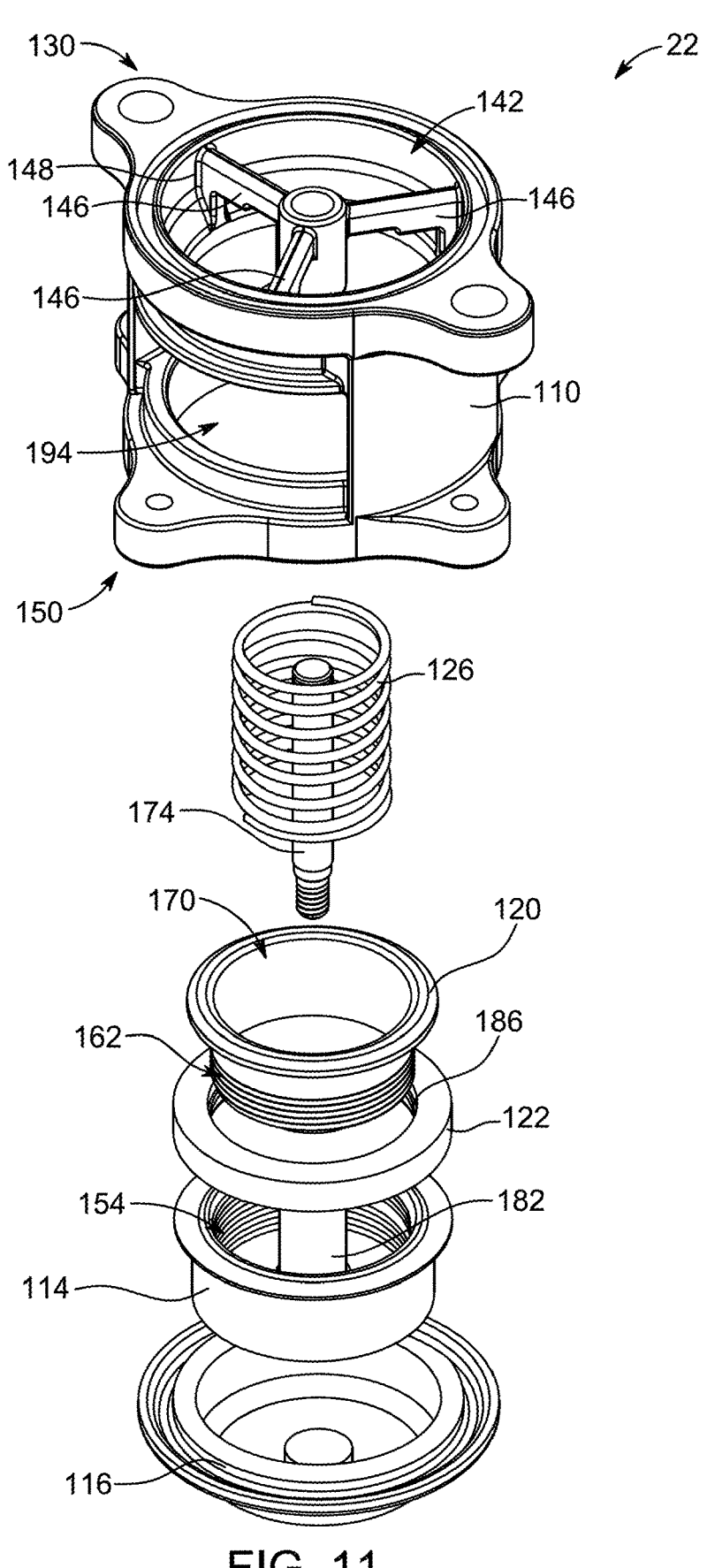
FIG. 11 is an exploded perspective view of the relief valve of FIG. 1.

FIG. 10 illustrates the relief valve cover 26 coupled to the frame 110 of the relief valve 22. As best illustrated in FIG. 11, the relief valve 22 includes the frame 110, a plunger 114, a rubber diaphragm 116, a lock nut 120, a seal 122, and a spring 126. Returning reference to FIG. 10, a first end 130 of the frame 110 faces the backflow preventer 5 of FIG. 1 and receives fasteners 134 to couple the relief valve 22, and thus the relief valve assembly 10 of FIG. 1, with the backflow preventer 5. Further, the frame 110 includes a surface 138 at the first end 130 having a bore 142 extending therethrough. In one configuration, the bore 142 is centrally positioned in the frame 110 of the relief valve 22. The frame 110 includes a plurality of arms 146 disposed in the bore 142. The plurality of arms 146 is recessed relative to the surface 138 at the first end 130 of the frame 110. In some embodiments, each of the plurality of arms 146 may have a chamfered edge 148 between each arm 146 and the frame 110. In other embodiments, each of the plurality of arms 146 may have a rounded surface between each arm 146 and the frame 110. A second end 150 of the frame 110, as illustrated in FIG. 11, is positioned opposite the first end 130 and is coupled to the attachment surface 66 of the relief valve cover 26 (FIGS. 7 and 10). Specifically, fasteners 90 may extend through the plurality of through holes 74 of the attachment surface 66 and engage the second end 150 of the frame 110 (FIG. 10). Peripheral openings 194 are positioned between the first end 130 and the second end 150 of the frame 110. As discussed below, fluid may enter the relief valve 22 through the bore 142 at the first end 130 and exit through the peripheral openings 194.

Figure 12:
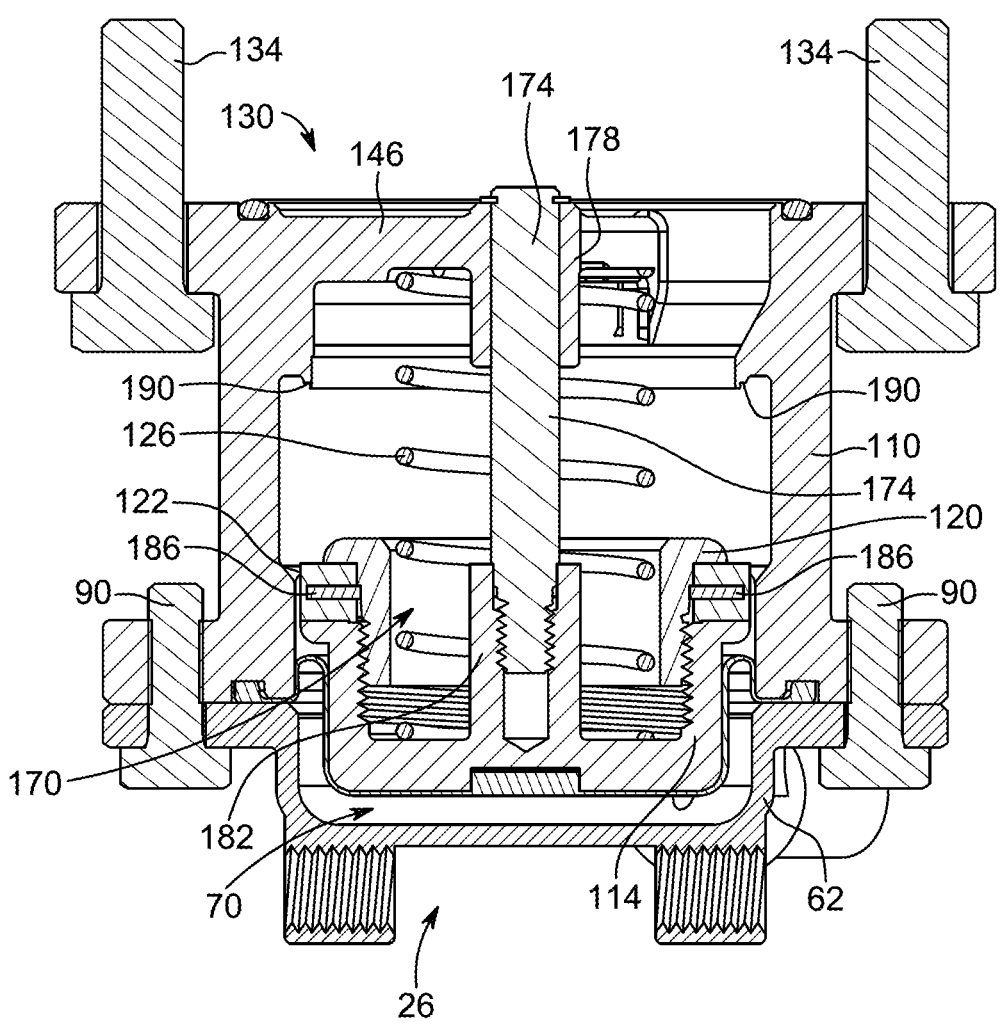
FIG. 12 is a cross-sectional view of the relief valve and the relief valve cover of FIG. 10 viewed along section 12-12.

With reference to FIGS. 11 and 12, each of the plunger 114, the lock nut 120, the seal 122, and the spring 126 is positioned within the frame 110 and the relief valve cover 26. Specifically, each of the plunger 114, the lock nut 120, the seal 122, and the spring 126 is movably positioned within the frame 110 and the relief valve cover 26.

Figure 13A:
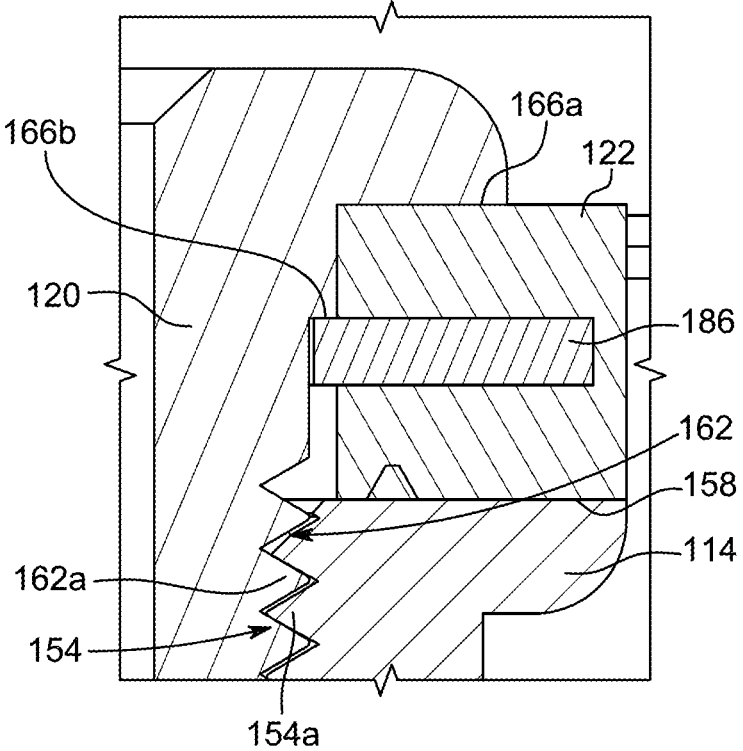
FIG. 13A is an enlarged cross-sectional view of a portion of the relief valve of FIG. 12.

As best illustrated in FIG. 13A, the plunger 114 includes a female fastening section 154 and a first seal engagement surface 158. The lock nut 120 includes a male fastening section 162 and a second seal engagement surface 166a. The male fastening section 162 of the lock nut 120 is engageable with the female fastening section 154 of the plunger 114 (for example, the female fastening section 154 receives the male fastening section 162). The lock nut 120 is coupled to the plunger 114 for movement with the plunger 114 when the female fastening section 154 receives the male fastening section 162. In the illustrated embodiment, the female fastening section 154 includes one or more female threads 154a, and the male fastening section 162 includes one or more male threads 162a. In other embodiments, the female fastening section 154 and the male fastening section 162 may include compatible fastening means other than the threads 154a, 162a.

Returning reference to FIGS. 11-12, the lock nut 120 additionally includes a through hole 170. When the lock nut 120 is coupled to the plunger 114, the spring 126 is received in the through hole 170 to engage the plunger 114. The spring 126 engages the plunger 114 to provide a biasing force on the plunger 114 directed toward the second end 150 (FIG. 11) of the frame 110. The bias provided by the spring 126 aids in an opening and closing function of the relief valve 22 (additional detail of the relief valve is provided below). The spring 126 surrounds a support rod 174 and is located so that it is surrounded by the seal 122. The support rod 174 provides structural support for the relief valve 22. The support rod 174 may be received by a rod receiving frame portion 178 and by a rod receiving plunger portion 182 that is opposite the rod receiving frame portion 178. The rod receiving plunger portion 182 is part of the plunger 114, and the rod receiving plunger portion 182 and the support rod 174 engage one another (e.g., in an interlocking manner), and movement of the plunger 114 results in movement of the support rod 174 (FIG. 12). The support rod 174 slides through the rod receiving frame portion 178 as the relief valve 22 opens and closes to improve and maintaining the alignment of the relief valve 22.

As best illustrated in FIG. 13A, the seal 122 is removably positioned between the first seal engagement surface 158 and the second seal engagement surface 166a. The first seal engagement surface 158 extends radially outwardly relative to the female fastening section 154. The second seal engagement surface 166a extends radially outwardly relative to the male fastening section 162. The male fastening section 162 is received by the female fastening section 154 to bring the first seal engagement surface 158 toward the second seal engagement surface 166a. Therefore, the seal 122 may be positioned between the first seal engagement surface 158 and the second seal engagement surface 166a. As the male fastening section 162 is received by the female fastening section 154, the seal 122 is secured to the relief valve 22 (FIG. 12) between the first seal engagement surface 158 and the second seal engagement surface 166a. The seal 122 may be compressed between the first seal engagement surface 158 and the second seal engagement surface 166a. In the illustrated embodiment, a rigid member 186 is disposed within the seal 122. The rigid member 186 may be a washer or another similar rigid member. The rigid member 186 is disposed within the seal 122 to inhibit deformity of the seal 122 during use of the relief valve assembly 10 of FIG. 1.

Figure 13B:
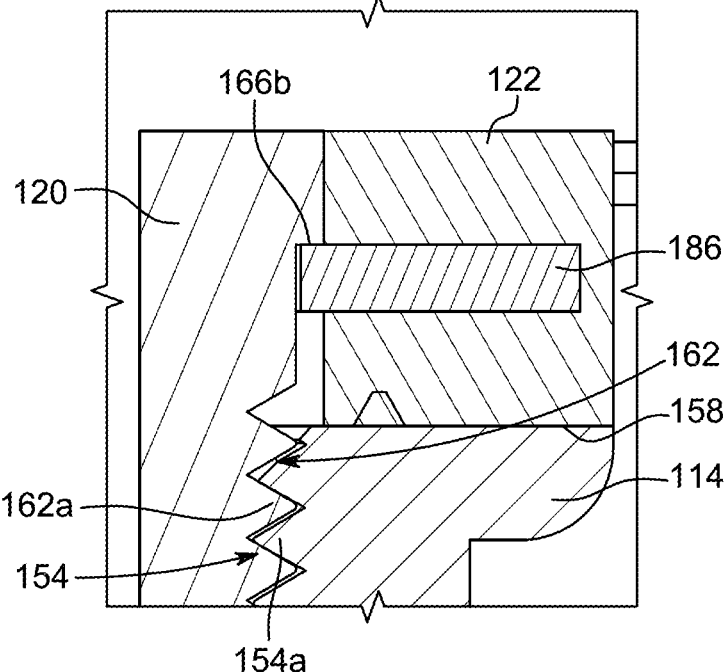
FIG. 13B is an enlarged cross-sectional view of a portion of the relief valve according to another embodiment.

In another embodiment, as illustrated in FIG. 13B, the lock nut 120 may not extend circumferentially over a top surface of the seal 122. Stated another way, the lock nut 120 may not include the second seal engagement surface 166a of FIG. 13A. Instead, the lock nut 120 may include a stepped second seal engagement surface 166b that directly engages a top surface of the rigid member 186. In such embodiments, the stepped second seal engagement surface 166b engages the top surface of the rigid member 186 to compress the seal 122 against the first seal engagement surface 158 of the plunger 114, thereby securing the seal 122 between the lock nut 120 and the plunger 114. As such, the stepped second seal engagement surface 166b may provide surface for engaging, or compressing, the seal 122. In some embodiments, as illustrated in FIG. 13A, the lock nut 120 may include both the second seal engagement surface 166a and the stepped second seal engagement surface 166b for compressing and securing the rigid member 186 against the first seal engagement surface 158.

Figure 14:
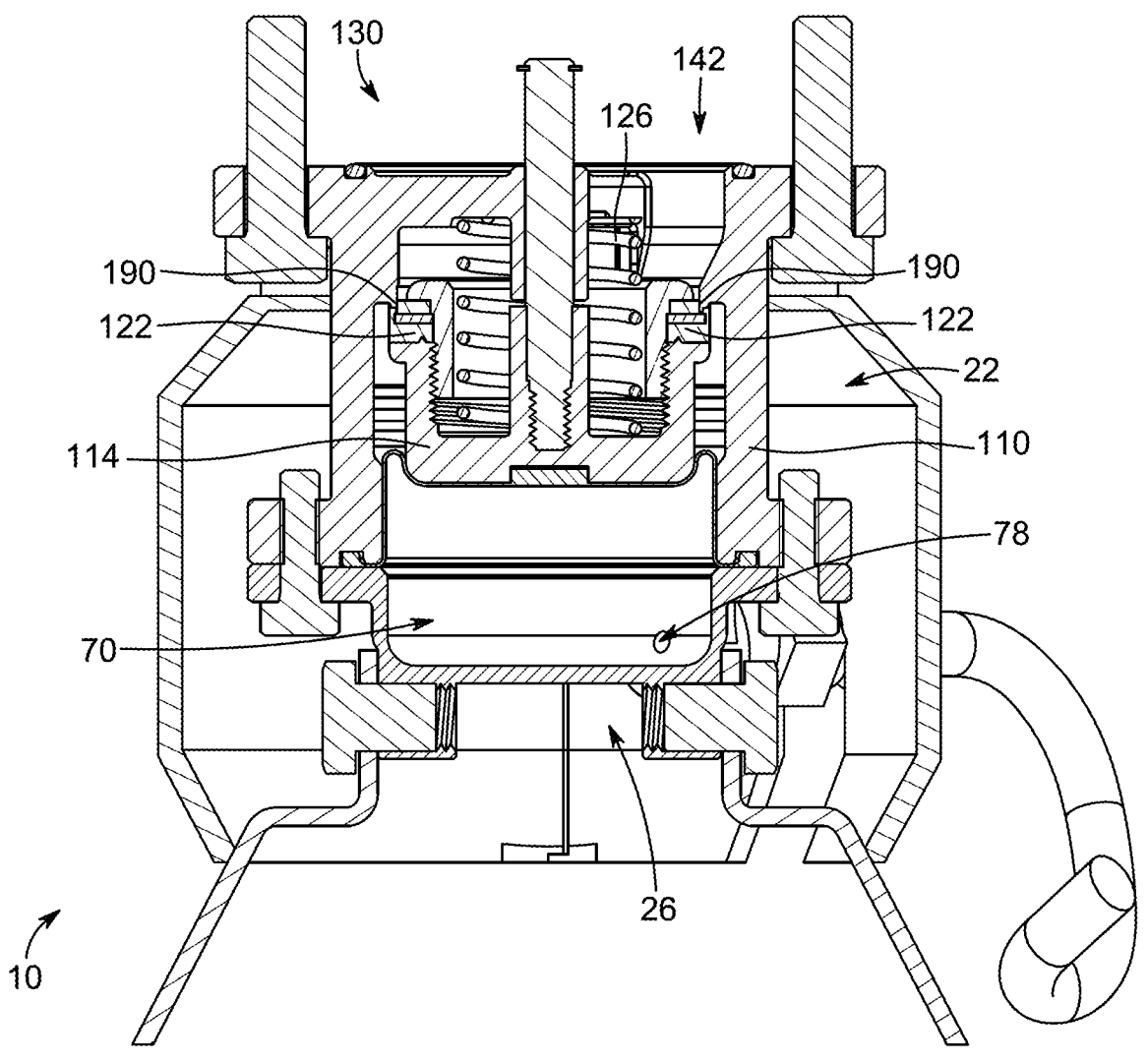
FIG. 14 is a cross-sectional view of a portion of the relief valve assembly of FIG. 1 viewed along a center of the relief valve assembly with the relief valve in a closed position.

FIG. 14 illustrates the relief valve assembly 10 in a normal operating condition of a backflow preventer 5 (FIG. 1) in which no backflow is present. In FIG. 14, the relief valve assembly 10 is in a closed state. In the closed state, the water supply passage 78 supplies fluid (not shown) to the recess 70 in the relief valve cover 26 at a pressure that pushes against the plunger 114. The recess 70 is positioned on a side of the plunger 114 remote from the spring 126 such that the pressure provided by the fluid works against the bias provided by the spring 126. The pressure supplied by the water supply passage 78 engages the plunger 114 with a force that is greater than the force provided by the spring 126 and water pressure at bore 142 that provides an opening to the backflow preventer 5. As such, the pressure provided by the fluid supplied from the water supply passage 78 pushes the plunger 114 against the bias of the spring 126 toward the first end 130 of the frame 110 of the relief valve 22. The pressure provided by the fluid pushes the plunger 114 to a point at which the seal 122 engages a ridge 190 (FIG. 12) on the frame 110. The seal 122 engages the ridge 190 to effectively inhibit fluid flow received from a backflow preventer 5 (FIG. 1) from traveling through the relief valve 22. In the illustrated embodiment, the effective area of the diaphragm 116 is approximately equal to an area of the seat opening (that is, the area of the opening defined by edge 190). Stated another way, a ratio of the effective area of the diaphragm 116 to the seat opening is approximately 1:1. The assembly provides a compact relief valve in which pressurized fluid acts on one side of the diaphragm 116.

Figure 15:
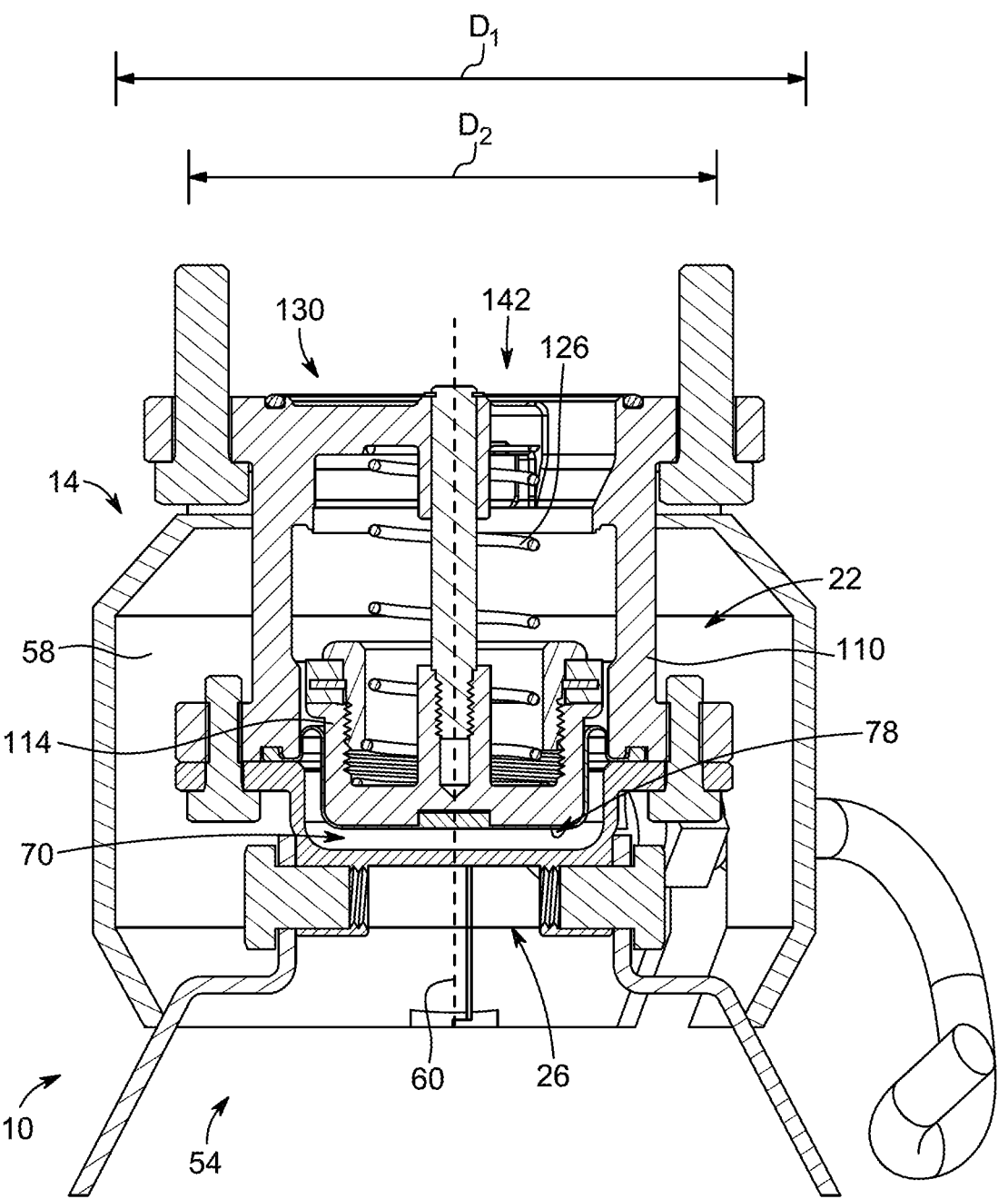
FIG. 15 is a cross-sectional view of a portion of the relief valve assembly of FIG. 1 viewed along a center of the relief valve assembly with the relief valve in an open position.

In some instances, the backflow preventer 5 (FIG. 1) may fail, or a user may want to simulate failure conditions to test if the relief valve assembly 10 is working properly under testing conditions. As illustrated in FIG. 15, under failure and testing conditions, fluid builds up at the first end 130 of the frame 110 of the relief valve 22. Eventually, enough fluid builds up such that the combined force of the spring 126 and the built-up fluid overcomes the force provided by the fluid supplied from the water supply passage 78. The combined force of the spring 126 and the fluid received from the backflow preventer 5 (FIG. 1) pushes the plunger 114 toward the second end 150 (FIG. 11) of the frame 110. The fluid then travels through the relief valve 22 and out of the peripheral openings 194 (FIG. 11) in the frame 110 of the relief valve 22. Fluid exiting the relief valve 22 then hits the peripheral wall 58 of the shroud 14 and is directed out of the outlet opening 54. The reduction in diameter from the maximum diameter $D_1$ of the shroud 14 to the reduced diameter $D_2$ of the outlet opening 54 directs the fluid out of the outlet opening 54 in a direction substantially parallel to the centerline 60 of the shroud 14. Substantially all of the fluid exiting through the outlet opening 54 is then received by the drain funnel 18 (FIG. 2). The pressure in the backflow preventer 5 (FIG. 1) is thus effectively relieved while minimizing fluid scatter.

From the foregoing, it will be seen that the disclosure is adapted to attain the ends and objects hereinabove set forth together with other advantages which are inherent to the structure and method. It will be understood that certain features and subcombinations are of utility and may be employed without reference to other features and sub combinations. Features described and illustrated with respect to certain embodiments may also be implemented in other embodiments. This is contemplated by and is within the scope of the claims. Since many possible embodiments of the disclosure may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present disclosure. As is evident from the foregoing description, certain aspects of the present disclosure are not limited by the particular details of the examples illustrated herein, and it is therefore contemplated that other modifications and applications, or equivalents thereof, will occur to those skilled in the art. The terms "comprising," "having," "including," and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A shroud for a relief valve, the shroud comprising:
a first portion having a first tongue and a first groove, the first groove positioned on an opposite side of the first portion from the first tongue; and
a second portion having a second tongue and a second groove, the second groove positioned on an opposite side of the second portion from the second tongue, the first groove receiving the second tongue and the second groove receiving the first tongue to enclose at least a portion of the relief valve;
at least one of the first portion and the second portion including a removable tab, removal of the removable tab forming a window in the one of the first portion and the second portion.

2. The shroud of claim 1, wherein the first portion and the second portion form an opening, an outlet positioned opposite the opening, and a peripheral wall extending between the opening and the outlet, wherein a portion of the peripheral wall defines a maximum diameter of the shroud, and the outlet has a diameter that is less than the maximum diameter.

3. The shroud of claim 2, wherein the peripheral wall includes an intermediate portion defining the maximum diameter, the peripheral wall tapering arcuately inward from the intermediate portion toward the outlet.

4. The shroud of claim 2, wherein the peripheral wall includes an intermediate portion defining the maximum diameter, the peripheral wall tapering linearly inward from the intermediate portion toward the outlet.

5. The shroud of claim 1, wherein each of the first tongue and the second tongue has a width, and wherein the first portion is extendable away from the second portion in a radial direction with respect to a longitudinal axis, the first portion extendable by a distance equal to the width.

6. The shroud of claim 1, wherein each of the first portion and the second portion further includes a fastener receiving tab adjacent a corresponding one of the first tongue and the second tongue.

7. A relief valve for a backflow preventer, the relief valve comprising:
a plunger having a female fastening section and a first seal engagement surface;
a lock nut having a male fastening section and a second seal engagement surface, the male fastening section received by the female fastening section to bring the first seal engagement surface toward the second seal engagement surface, the lock nut including a through hole;

a seal positioned between the first seal engagement surface and the second seal engagement surface; and a compression spring positioned in the through hole of the lock nut to engage the plunger.

8. The relief valve of claim 7, further comprising a frame having a surface, a bore, and a plurality of arms positioned within the bore, the surface of the frame configured to face the backflow preventer, the plurality of arms being recessed relative to the surface of the frame.

9. The relief valve of claim 7, wherein a rigid member is disposed within the seal, the rigid member directly engaging a stepped portion of the second seal engagement surface.

10. The relief valve of claim 9, wherein the seal is over molded on the rigid member.

11. The relief valve of claim 7, wherein the male fastening section includes one or more male threads, and wherein the female fastening section includes one or more female threads.

12. The relief valve of claim 7, further comprising a shroud including a first portion coupled to a second portion, the shroud including an opening, an outlet positioned opposite the opening, and a peripheral wall extending between the opening and the outlet, wherein a portion of the peripheral wall defines a maximum diameter of the shroud, and the outlet has a diameter that is less than the maximum diameter.

13. The relief valve of claim 12, wherein at least one of the first portion and the second portion includes a removable tab, removal of the removable tab forming a window in the one of the first portion and the second portion.

14. The relief valve of claim 12, wherein at least one of the first portion and the second portion includes a window.

15. A relief valve cover for coupling a drain funnel to a relief valve, the relief valve cover comprising:

a cover body for providing a fluid seal to cover an end opening of the relief valve, the cover body including an attachment surface, the attachment surface including a first opening configured to receive a first fastener for coupling the cover body to a frame of the relief valve;

a water supply passage positioned in the cover body;

a recess positioned on the cover body adjacent the attachment surface, the recess in fluid communication with the water supply passage and receiving pressurized water from the water supply passage, pressurized water in the recess configured to act on a valve member of the relief valve against a force exerted by a biasing member; and a second opening configured to receive a second fastener to engage the drain funnel, the second opening not extending through the attachment surface.

16. The relief valve cover of claim 15, wherein the second opening extends along an axis that is substantially parallel to the attachment surface.

17. The relief valve cover of claim 15, wherein the second opening is located on a side of the recess opposite the attachment surface.

18. The relief valve cover of claim 15, further comprising a projection extending from the recess in a direction away from the attachment surface, the projection including the second opening.

19. The relief valve cover of claim 18, wherein the projection is one of a plurality of projections, and the second opening is one of a plurality of second openings, each one of the projections including a corresponding one of the plurality of second openings extending therethrough.

20. The relief valve cover of claim 15, further comprising a flange surrounding the recess, the flange including the attachment surface, wherein the first opening is one of a plurality of first openings that extend through the flange.

* * * * *